H. F. FOSTER.
CHUCK.
APPLICATION FILED SEPT. 13, 1917.
1,281,773.
Patented Oct. 15, 1918.
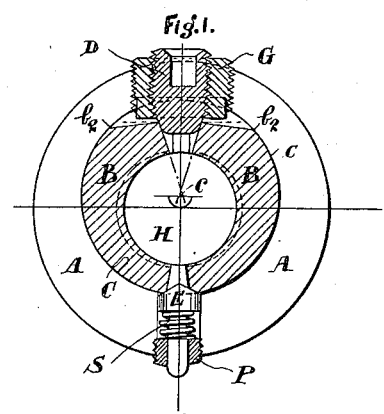
Fig. 1.
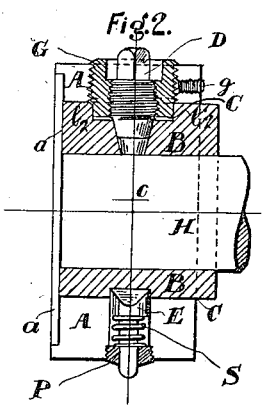
Fig. 2.
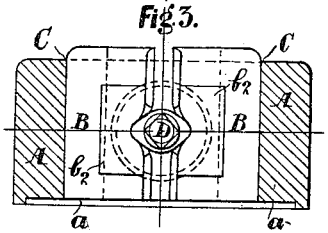
Fig. 3.
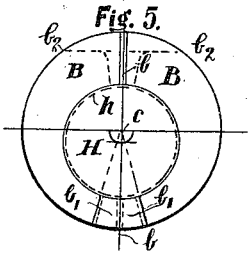
Fig. 5.
Fig. 4.
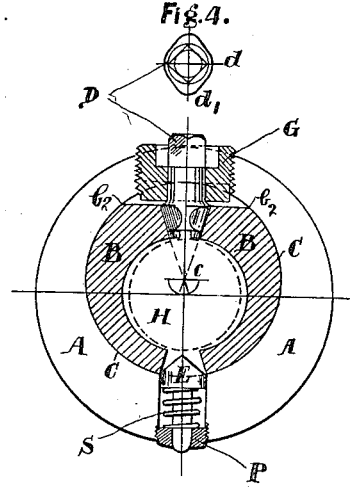
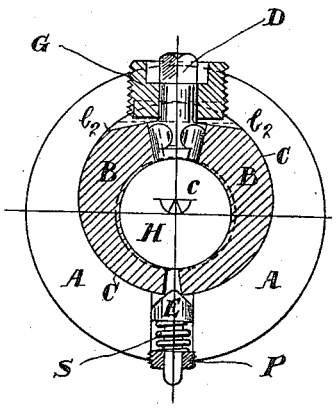
Fig. 6.
Fig. 7.
INVENTOR
Herbert Fraser Foster
BY
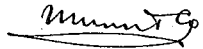
ATTORNEY

UNITED STATES PATENT OFFICE.

HERBERT FRASER FOSTER, OF EPSOM, ENGLAND.

CHUCK.

1,281,773.   Specification of Letters Patent.   Patented Oct. 15, 1918.

Application filed September 13, 1917. Serial No. 191,157.

*To all whom it may concern:*

Be it known that I, HERBERT FRASER FOSTER, a subject of the King of Great Britain and Ireland, and residing at Stanley House, Epsom, in the county of Surrey, England, have invented certain new and useful Improvements in Chucks, of which the following is a specification.

This invention relates to improvements in chucks of the self-centering type. The chuck is especially suitable for repetition work where great accuracy is required such for example as in the turning of shell cases, each chuck being designed for a given diameter of shell.

The invention consists in an improved chuck having jaws fitting within an eccentric circular cylindrical space in the chuck, the jaws being adapted to be pressed together on to the work by a wedge or the like.

The invention further consists in supporting the ends of the chuck opposite such wedge by a spring pressed wedge-piece whereby the two parts of the chuck are kept in a symmetrical position relatively to the central plane through the chuck.

The invention also consists in the improved chuck hereinafter described.

Referring to the accompanying drawings:—

Figure 1 shows the general arrangement of the assembled parts of the chuck in section in the closed position, the dotted lines showing the position occupied by the jaws when opened.

Fig. 2 shows a cross-section of the same form of chuck with the difference that the closing acorn or thimble wedge has a protruding square head instead of the countersunk square head as in Fig. 1.

Fig. 3 shows a sectional plan of the chuck operated by a diamond-shaped wedge with the major axis in position, showing the jaws closed.

Fig. 4 is a plan view of the chuck operating diamond-shaped wedge.

Fig. 5 shows the manner in which the jaws are cut after machining from the solid bar so as to accommodate the closing and releasing wedges, the dotted lines showing the sectioning and the bore prior to machining the jaws in position within the body of the chuck to the required diameter of the work to be held.

Fig. 6 shows a vertical section of the chuck with the diamond wedge in the closed position as in Fig. 3.

Fig. 7 shows a vertical section of the chuck with a diamond wedge with the minor axis in position showing the jaws open, the dotted lines showing the position of the jaws when closed.

In carrying the invention into effect as illustrated in Figs. 1 and 2, the chuck body A A is bored eccentrically and is provided with a recess $a$ $a$ by which it is centered in the lathe against a back plate or like in the usual manner. A solid cylindrical rod is fitted into the eccentric aperture in the chuck body and bored centrally to a diameter equal to that of the work for which the chuck is designed. The solid rod is then cut across diametrically and wedge-shaped pieces are cut from the two parts which then form the jaws B B. These two jaws are placed in the eccentric opening in the chuck body and are held symmetrically by the spring wedge piece E.

It will be seen that by inserting the thimble D and turning it about the vertical axis the upper ends of the jaws B B will be separated, closing the jaws so that they grip the work at the predetermined diameter.

Further segments are cut from the jaws as shown at $b^2$ $b^2$ to allow the insertion of the plug G in which the closing wedge D is held.

In Fig. 6 the full lines at $b'$ $b'$ show the position of the jaws open while the dotted lines show the position of the jaws when closed on the work.

The operation of the above described chuck is as follows:—The work is first turned to very near the finished diameter in an ordinary chuck and is then placed within the space between the jaws B B. The closing wedge D is then turned, separating the upper ends of the jaws B B which thus slide in the eccentric cavity $c$ in the chuck body, closing the jaws tightly on to the work H. In order to release the work the wedge piece D is turned in the opposite direction and a smart blow struck on the pin projecting from the spring pressed wedge piece E, thus instantaneously releasing the work. The plug G also serves as a fine adjustment to allow for wear of the wedge piece by which the jaws are closed.

When the wedge piece becomes worn it is only necessary to screw the plug $g$ slightly farther inward to make up for this wear.

The expanding screw wedge D as shown in Figs. 1 and 2, is shaped somewhat similar to an acorn or thimble and can be made of cast steel hardened with a countersunk square or protruding square head as illustrated.

Figs. 3, 6 and 7 show the jaws B, B operated by a diamond-shaped wedge D made slightly tapered with a minor and major axis $d$ and $d^1$, so that a movement through 90° or thereabouts moves the jaws B, B around in accordance with the difference in diameter of the said minor and major axis.

In order to quickly take apart or to retain the jaws B, B in position within the body of the chuck A, A, and to facilitate the carrying and removal or renewal of the expanding wedges D, a steel collar G is screwed so as to protrude some distance through the said chuck body A into the eccentric cavity occupied by the jaws B, B, the said jaws having suitable recesses cut away in them as shown in Figs. 1, 2, 3, 5, 6 and 7, by $b^2$, to receive the said screwed collar G which also forms a fine adjustment for obtaining the required pressure for closing the jaws B, B and to compensate for the wear on the wedge D and other working parts by raising or lowering the position by the said collar G which can be fixed by the screw $g$ as shown in Fig. 2.

In order to expedite the opening of the jaws B, B and to preserve their accurate location within the eccentric cavity C, a releasing wedge E is placed diametrically opposite the wedge D and has an inclined plane on each side substantially as shown in Figs. 1, 2, 6 and 7, which exerts pressure on the jaws B, B, and keeps them apart, owing to the strong spring S which forces the said releasing wedge E upward from the screw plug P as shown in the drawings.

Having now described my invention, what I claim as new and desire to secure by Letters Patent is:—

1. An improved chuck comprising in combination a chuck body, an eccentric circular cylindrical space in said body, jaws fitting within said eccentric circular cylindrical space, and means for pressing said jaws together by movement in a circumferential direction, and a spring-pressed wedge-piece adapted to keep said jaws in a symmetrical position, as set forth.

2. An improved chuck comprising in combination a chuck body, an eccentric circular cylindrial space in said body, jaws fitting within said ecentric circular cylindrical space, means for pressing said jaws together by movement in a circumferential direction, and a releasing wedge having inclined planes operated by a spring, as set forth.

In testimony whereof I have signed my name to this specification.

HERBERT FRASER FOSTER.

Copies of this patent may be obtained for five cents each, by addressing the "Commissioner of Patents, Washington, D. C."